United States Patent [19]

Parker et al.

[11] 3,859,130

[45] *Jan. 7, 1975

[54] MAGNETIC ALLOY PARTICLE COMPOSITIONS AND METHOD OF MANUFACTURE

[75] Inventors: Charles C. Parker, Longmont, Colo.; Rhodes W. Polleys, Concord, Mass.; Joseph S. Vranka, Boulder, Colo.

[73] Assignee: International Business Machines Corporation, Armonk, N.Y.

[ * ] Notice: The portion of the term of this patent subsequent to Apr. 10, 1990, has been disclaimed.

[22] Filed: Dec. 27, 1972

[21] Appl. No.: 318,784

Related U.S. Application Data

[60] Continuation of Ser. No. 134,421, April 15, 1971, Pat. No. 3,726,664, which is a division of Ser. No. 812,433, April 1, 1969, abandoned.

[52] U.S. Cl. ............... 117/240, 117/235, 252/62.54

[51] Int. Cl. ........................................ H01f 10/02

[58] Field of Search ............ 117/235, 240; 75/.5 A, 75/.5 AA; 252/62.54

[56] References Cited

UNITED STATES PATENTS

| | | | |
|---|---|---|---|
| 3,140,188 | 7/1964 | Zirngiebl et al. | 117/160 X |
| 3,206,338 | 9/1965 | Miller et al. | 148/105 |
| 3,295,999 | 1/1967 | Klein et al. | 117/47 X |
| 3,310,430 | 3/1967 | Schneble et al. | 117/130 |
| 3,483,029 | 12/1969 | Koretzky et al. | 117/240 |
| 3,494,760 | 2/1970 | Ginder | 75/.5 |
| 3,532,541 | 10/1970 | Koretzky et al. | 117/240 |
| 3,567,525 | 3/1971 | Graham et al. | 75/.5 |

*Primary Examiner*—William D. Martin
*Assistant Examiner*—Bernard D. Pianalto
*Attorney, Agent, or Firm*—Donald W. Margolis

[57] ABSTRACT

This invention relates to the preparation of magnetic recording media including finely divided magnetic particles. It especially relates to the preparation of high coercivity, finely divided magnetic alloy particles for use in recording media by reduction of salts of cobalt, and mixtures of salts of cobalt and iron, mixtures of salts of cobalt and nickel, in a bath containing hypophosphite and amine borane anion reducing agents. Sodium hypophosphite and dimethyl amine borane or any soluble salts which provide hypophosphite and amine borane anions in solution are reacted with soluble metal salts of cobalt alone, or cobalt with iron, or nickel dissolved in the bath. After separating and drying, the precipitate is found to consist of non-pyrophoric magnetic alloy particles, including about 0.1–5% phosphorus and about 0.1–1.5% boron, which are generally spherical in shape and which vary in size from about 0.01 micron to 3.0 microns in diameter. These particles are dispersed in a binder, the dispersion coated on a substrate, and dried to form a recording media.

8 Claims, No Drawings

MAGNETIC ALLOY PARTICLE COMPOSITIONS AND METHOD OF MANUFACTURE

This is a continuation of application Ser. No. 134,421, filed Apr. 15, 1971, now U.S. Pat. 3,726,664 which is a division of application Ser. No. 812,433, filed Apr. 1, 1969, and now abandoned.

BACKGROUND OF THE INVENTION

1. Field of the Invention

This invention relates to magnetic alloy compositions and to a novel method for preparing finely divided magnetic alloy particles. Such particles are suitable for use in magnetic recording media, permanent magnets, magnetic cores, and in magnetically responsive fluid suspensions, such as magnetic or electrostrictive clutch couplings or the like.

2. Description of the Prior Art

In the prior art, magnetic particles of the free metal, alloy and oxide type, have prepared in numerous ways. In one common type of preparation, cobalt, iron, and nickel compounds are prepared, often by chemcial precipitation, and then decomposed, oxidized, and/or reduced to produce either oxide, metal, or alloy magnetic particles. In another type of preparation, solutions of cobalt, iron, or nickel salts are subjected to reduction at the cathode of an electrolytic cell to produce continuous magnetic films or particles. In yet another technique, solutions of cobalt, iron, and nickel salts are subjected to chemical reduction by the action of a reducing agent on the metal cations. In the prior art, such chemical or electroless reduction procedures have most often been carried out to produce continuous films or coatings. In such electroless plating procedures, reducing agents have commonly been of the hypophosphite, boron-nitrogen, borohydride, or organic formate type. It has been observed that in such electroless film plating procedures the plating bath is sometimes subjected to catastrophic decomposition, whereby a large portion of the metal cation content of the solution is vigorously and quickly reduced. The resulting deposition material is normally a mixture of film and particles covering a wide range of sizes and shapes. It has been determined that such unwanted catastrophic decomposition during film plating is usually brought about by a combination of excessive heating of the electroless solution, a change in pH, the build up of nucleating material, such as insoluble salts, or the addition of catalytic material to the bath. Since the material plated in an electroless bath is itself autocatalytic to the decomposition reaction, once uncontrolled decomposition begins, it increases in an avalanching manner, so that plate-out of the bath is accomplished in a very short time.

As has been already noted, electroless plating baths have been most often used in the prior art to produce continuous films. Development of related technology has been heavily aimed at achieving means to avoid catastrophic decomposition. In the few instances there electroless baths have been used to intentionally produce particles, finely divided particles having uniform size and good magnetic characteristics have been produced only by initiating the decomposition reaction with catalytic metals or their salts, while utilizing temperature, pH, and concentration parameters to vary the physical properties of the particles. The catalytic material most often used for initiating controlled chemical reduction of magnetic metal salts to form particles has been palladium and its salts. In view of the high cost and limited availability of palladium and its salts, it is desirable to have other techniques for producing uniform, finely divided magnetic particles by chemical reduction. The present invention provides a highly effective technique for producing such finely divided magnetic particles without utilizing catalytic materials to initiate or control the reduction. As a result of the technique employed, unique magnetic alloys are also provided.

SUMMARY OF THE INVENTION

It is an object of the present invention to provide new and improved techniques for manufacturing finely divided magnetic alloy compositions.

Another object of this invention is to provide a unique metal-phosphorus-boron alloy composition in finely divided form having magnetic properties suitable for use in magnetic recording media, permanent magnets, magnetic cores, and in magnetically responsive fluid suspensions.

The present invention provides a new finely divided, non-pyrophoric, ferromagnetic composition in the form of microscopic particles consisting essentially by weight of 0.1–5% phosphorus, 0.1–5% boron, 0.8–10% oxygen, and the balance cobalt, cobalt-nickel, or cobalt-iron.

The present invention also relates to a method of making finely divided magnetic alloy particles by dissolving a metal salt of cobalt, or mixtures of cobalt and iron, or cobalt and nickel salts in a bath, preferably aqueous, and reducing the metal salts with sodium hypophosphite and dimethylamine borane or other sources of hypophosphite and amine borane anions which dissolve in the bath, thereby precipitating alloy particles by chemical oxidation-reduction to produce metal-phosphorusboron particles of spherical structure in a narrow range of particle sizes varying between about 0.01 to 3.0 microns.

In preparing the reaction mixture, any soluble cobalt, iron and cobalt, or nickel and cobalt salts may be dissolved in a bath with any soluble source of hypophosphite anion and heated. A separate solution of amine borane anion is prepared. Upon mixing these separate solutions, a clear solution is initially formed. Reduction and precipitation are effected spontaneously after a short time, with or without continued heating. In an alternative technique for producing alloy particles, a heated solution of metal salts, including any soluble source of amino borane, may have added thereto a solution containing sodium hypophosphite or any soluble hypophosphite salt dissolved therein. Yet another techinque for producing alloy particles is the preparation of a solution of hypophosphite and amine borane anions to which a solution of soluble cobalt, iron, or nickel salt is added. Precipitated magnetic particles are separated by filtering, decanting, centrifuging, magnetic separation, or any other suitable means.

Spherical cobalt-phosphorus-boron, cobalt-iron-phosphorus-boron, or cobalt-nickel-phosphorus-boron alloy particles are formed by these reactions.

Alloy particles produced with this invention display intrinsic coercivities up to 600 oersteds and more. The saturation magnetization per gram, $\sigma_s$, ranges up to 161 electromagnetic units per gram, and the squareness ratio $M_r/M_s$ is in the range of about 0.16 to 0.46. They are in the form of finely divided spherical particles about 0.01 to 3 microns in diameter, with the vast majority between 0.01 and 1.0 micron in diameter. After formation in solution, the particles tend to form both agglomerates and chains.

The foregoing and other objects, features, and advantages of the invention will be apparent from the following more particular description of preferred embodiments of the invention.

DESCRIPTION OF THE PREFERRED EMBODIMENTS

In the following examples, all solutions were prepared with distilled water and reagent grade chemicals. Unless otherwise clearly indicated, the total volume of the reaction mixture was approximately one liter. In order to bring the solutions together rapidly and completely agitation via a magnetic stirring bar was employed. Particles produced by the method of the present invention were separated from the reaction mixture, usually magnetically, and washed with water and acetone. The particles were then dried, usually under non-oxidizing conditions. While precautions were taken to avoid exposing the particles to oxygen, prior to and during drying, the resulting particles exhibited from about 0.8 to 10% oxygen content, by weight. In most instances the oxygen content was less then 2% by weight of the alloy and was limited almost entirely to the skin or shell of the particles.

Powder samples of the alloys produced by the present invention were measured with a vibrating sample magnetometer, VSM, to determine their magnetic properties. Determination of the chemical content of the alloy particles was obtained by both x-ray fluorescence and neutron activation. Particle size and shape was determined from electron micrographs of the particles.

While the products of the present invention consist predominantly of cobalt, nickel, iron, and their alloys, there is associated therewith small, but significant quantities of phosphorus, boron, and oxygen, as indicated by analysis. It would appear that during the course of reduction of the metal cations to metal, a small amount of the phosphorus in the hypophosphite anion and the boron in the amine borane anion is oxidized to the neutral states. The resulting phosphorus and boron formed thereby, is co-precipitated with the reduced metal to form an alloy. It further appears that during the washing and drying steps of the method, some small degree of oxidation of the surfaces of the particles occurs with the result that the final product contains oxygen.

All alloy compositions in the examples are given in weight percent.

EXAMPLE 1

An aqueous solution containing 10 g. cobalt sulfate ($CoSO_4.2H_2O$), 10 g. sodium citrate ($Na_3C_6H_5O_7.2H_2O$) and 20 g. sodium hypophosphite ($NaH_2PO_2.H_2O$) in 800 ml. of water was prepared and heated to 95°C. A separate solution of 10 g. dimethylamine borane ($(CH_3)_2NBH_3$) in 60 ml. water was prepared. The dimethylamine borane solution and 125 ml. of 29% ammonium hydroxide ($NH_4OH$) were then poured into the cobalt bath with magnetic stirring. A clear solution, without any precipitate or noticeable reaction was formed. After approximately three minutes, with continued heating and stirring, a vigorous reaction took place and a black, finely divided precipitate was formed. This precipitate was washed thoroughly with water and then with acetone, and dried in the absence of air. The resulting particles were packed in a glass cylinder for measurement of magnetic properties by the VSM. The saturation magnetization per gram or sigma value was 114 emu/g. at 4000 oerateds, and the intrinsic coercive force was 437 oersteds. Electron micrographs of the powder indicated that it consisted of spherical particles, 0.01 to 1 micron is diameter. Analysis indicated that the particles consisted essentially by weight of 1.5% phosphorus, 0.1% boron, less than 5% oxygen, the oxygen being limited almost entirely to the surface of the particles, and the balance cobalt.

A second preparation of this product was carried out in precisely the same manner, and the resulting particles exhibited a sigma value of 115 emu/g. and a coercivity of 490 oersteds. The particles consisted of 1% phosphorus, 0.1% boron, less than 5% oxygen, and the balance cobalt.

The preparation was repeated once more, as described above, with the exception that the temperature of the bath was held at 90°C. Particles began forming in the bath approximately 120 to 140 seconds after the mixture of the dimethylamine borane solution and the cobalt bath and continued to form for 8 minutes thereafter. After particle formation has ceased and the particles were removed from the solution, it was noted that the supernatant liquid was colorless, and without the pink coloration normally attributed to cobalt salts. Spectral analysis was performed on the depleted solution. No absorbence peaks were evident for the divalent cobalt amine complex, the trivalent cobalt amine complex, or the divalent cobalt citrate complex. As these complexes are known to be quite stable, evidence of their absence in the solution, as well as the colorless nature of the solution was taken as a strong indication that substantially all of the cobalt cations had been removed from solution by the reaction of this invention. Analysis of the particles formed in the latter expermiment indicated a sigma value of 84 emu/g., and a coercivity of 425 oersteds. The particles contained about 96.6% cobalt, 2% phosphorus, 0.2% boron, and 1.2% oxygen. They were spherical and ranged in size from 0.1 to 3 microns in diameter.

EXAMPLE II

In view of the outstanding cobalt yield indicated by the previous experiments, it was decided to prepare cobalt particles by the classical method of palledium seeding, and then add amine borane to the remaining cabalt cation and hypophosphite anion in what would normally be considered a spent bath by the prior art.

To a one liter bath containing 35g. $CoSO_4.7H_2O$, 35 g. $Na_3C_6H_5O_7.2H_2O$, 66 g. ammonium sulfate ($(NH_4)_2SO_4$), 20 g. $NaH_2PO_2.H_2O$ and 100 ml. of 29% $NH_4OH$, and heated to 88°C in a resin kettle, was added approximately 0.1 g. $PdC1_2$. An instantaneous and vigorous exothermic reaction took place, causing a finely divided black material to be precipitated in the bath. The reaction was allowed to proceed to completion while maintaining the temperature of the bath at 88°C. As a matter of interest, the powder formed was analyzed and found to be a cobalt-phosphorus alloy containing about 0.6% phosphorus and having a sigma value of 99 emu/g. and an intrinsic coercivity of 486 oersteds.

After all traces of the magnetic material produced by palladium seeding were removed from the bath, the supernatant liquid was poured into a two-liter beaker and once more heated to 88°C. To this spent bath was then added 2 g. of $(CH_3)_2$ $NBH_3$ as well as an additional 50 ml. of 29% $NH_4OH$ to assure a basic solution. Upon addition of the dimethylamine borane, a turbulent reaction once more took place with the formation of additional finely divided black particles. The particles formed in this latter reaction were collected magnetically, washed with water and acetone and dried at 60°C in a vacuum oven. They were found to be cobalt-phosphorus-boron alloy, containing 0.5% phosphorus and 0.2% boron, and having a sigma value of 106 emu/g. and an intrinsic coercivity of 622 oersteds.

EXAMPLE III

In order to determine what effect the source of hydroxide ions had, if any, on the reaction, sodium hydroxide was substituted for ammonium hydroxide in the reaction.

A one liter bath containing 35 g. $CoSO_4$. $7H_2O$, 35 g. $Na_3C_6H_5O_7.2H_2O$, and 20 $NaH_2PO_2.H_2O$ was heated to 65°C and brought to a volume of one liter by the addition of 200 ml. of 1N NaOH and 75 ml. of a solution of 10 g. $(CH_3)_2NBH_3$. The latter two solutions had been heated to 65°C prior to adding them to the cobalt solution. A blue floculate, believed to be cobalt hydroxide, formed in the bath, but began to dissolve after approximately 4 minutes. As the floculate dissolved, a black precipitate formed in the bath, with this latter reaction becoming more vigorous as it proceeded. The resulting product was found to have a sigma value of 118 emu/g. and an intrinsic coercivity of 75 oersteds. It consisted of 0.5% phosphorus, and 0.5% boron, with the balance cobalt.

EXAMPLE IV

The formation of cobalt-nickel alloy by the method of the present invention is of interest.

To 800 ml. of hot, distilled water was added 8 g. $CoSO_4.7H_2O$, 2 g. nickel sulfate ($NiSO_4.6H_2O$), 10 g. $Na_3C_6H_5O_,.2H_2O$ and 20 g. $NaH_2PO_2.H_2O$. To this bath was added a 90°C solution of 10 g. $(CH_3)_2NBH$, in 50 ml. of water. The bath temperature was maintained at 92°C for 4 minutes without the formation of any precipitate. At this point 15 to 20 ml. of 29% $NH_4OH$ was added to the solution. An immediate and violent reaction took place causing the formation of finely divided black particles and much heat. The reaction proceeded to completion quite rapidly with apparent good efficiency. The resulting spherical particles were about 0.01 to about 0.1 micron in diameter and exhibited a sigma value of 50 emu/g. and an intrinsic coercivity of 249 oersteds as measured on the VSM. The particles were determined to contain a ratio of cobalt to nickel of 2.15 : 1 as well as approximately 1% by weight of oxygen, the oxygen being concentrated almost entirely in the shell of the particles. Exclusive of oxygen, the alloy particles consisted of 66.5% cobalt, 31% phosphorus, and 0.5% boron, by weight.

EXAMPLE V

The formation of iron-cobalt alloys by the method of the present invention is also of interest.

To aviod the formation of interfering iron oxides or hydroxides during the reaction, 800 ml. of water was purged of oxygen by the process of bubbling nitrogen through the water for an extended period of time. To 800 ml. of this purged water was added 4 g. $CoSO_4.7H_2O$, 6 g. ferrous sulfate ($FeSO_4$), 10 g. $Na_3C_6H_5O_,.2H_2O$, and 20 g. $NaH_2PO_2.H_2O$, without reaction. The bath was heated to 95°C at which time 125 ml. of 29% $NH_4OH$ and 10 g. $(CH_3)_2NBH_3$ were added to the bath. The temperature of the bath was maintained at 95°C for 5 minutes without any reaction occurring. At this time an additional 125 ml. of 29% $NH_4OH$ was added to the bath along with an additional 10 g. of dimethylamine borane. A mild reaction was noted in the bath which continued for about 20 minutes with the resulting formation of finely divided black particles. The particles were recovered from the bath with a magnet, washed with water and acetone and dried. By electron micrography it was determined that the particles thus formed were spherical and had diameters on the order of 0.01 to 0.1 micron. Examination of a powder sample by the VSM indicated a sigma vallue of 161 emu/g. and an intrinsic coercivity of 103 oersteds. Exclusive of oxygen, the alloy was determined to contain 70.9% cobalt, 28% iron, 1% phosphorus and 0.1% boron, by weight.

EXAMPLE VI

A nickel alloy containing 5% phosphorus and 1.5% boron was prepared by dissolving 11 g. $NiSO_4.6H_2O$, 10 g. $Na_3C_6H_3O_,.2H_2O$, and 20 g. $NaH_2PO_2.H_2O$ in 800 ml. of hot distilled water. To this solution was added a hot solution containing 10 g. $(CH_3)_2NBH_3$. The entire bath was maintained at 95°C. In less than 60 seconds a vigorous reaction began which resulted in the formation of finely divided black spherical particles which were determined to have a diameter of about 0.1 micron, X-ray analysis indicated a large percentage of nickel oxide throughout the particles, with oxygen constituting about 10% by weight of the particles formed.

EXAMPLE VII

The formation of particles of non-ferromagnetic metal alloys by the method of the present invention is of interest. Preparation of copper alloys by the method of this invention was successfully carried out.

To 800 ml. of hot, distilled water was added 9 g. copper sulfate ($CuSO_4.5H_2O$), 10 g. $Na_3C_6H_5O_7.2H_2O$, and 20 g. $NaH_2PO_2.H_2O$. To this bath was added a hot solution containing 10 g. $(CH_3)_2NBH_3$, and the entire mixture was maintained at 80°C. Almost immediately a vigorous reaction began which resulted in the formation of finely divided particles. The resulting copper alloy particles included about 0.1% boron and 0.1% phosphorus. A large amount of oxygen also conbined with the particles and CuO was detectable. These particles are suitable for use as catalysts in organic reactions and may be blended with binder material in the formation of conductive matrices.

Proportions of the reactants in the foregoing examples can be varied considerably. Concentrations may range up to saturation. However, solutions of lower concentration have been found to be suitable.

The process of this invention is normally carried out under atmospheric conditions. However, moderate variations in pressure, for example, from 0.5 to 5 atmospheres may sometimes be desirable.

While a convenient method for carrying out the process of this invention is to place solutions of salt in a suitable container, such as glass, resin, or stainless steel, the invention may easily be modified for continuous operation. Reactants may be introduced into a reaction vessel or tube in appropriately proportioned quantities, and the reaction mixture, including the reaction products, continuously withdrawn. With this latter type of operation, much larger quantities of reactants can be efficiently and conveniently processed.

Any soluble salt of cobalt, iron, or nickel may be used, and the halides, nitrates, sulfates and acetates are representative salts which are readily available and have been used with good results. Soluble salts of other metals which are reducible to metal is solution may also be utilized in accordance with the teachings of this invention.

For reasons of economy and availability, dimethyl amine borane and sodium hypophosphite are the preferred sources of amine borane and hypophosphite anions. However, other soluble amine boranes and hypophosphites may be used. All of the alkali metal hypophosphites are suitable sources of hypophosphite anion. Other sources of amine borane include, for example, ammonia borane, monomethylamino borane, ethylamine borane, tertiary propylamine borane, and isopropylamine borane. Other boron-nitrogen reducing agents may be substituted for amine borane materials. These include borozanes, in which the amine boranes are encompassed, borazenes, borazines, and borazoles.

While water is a convenient medium for carrying out the process of the invention, other media, including organic liquids, and especially water-miscible organic liquids can be used.

The use of buffering materials, complexing materials, and pH controls constituents in the reaction bath is a matter of technical choice. As is well known, these materials, and the techniques of using them, control the availability of various ions as well as the formation of interfering oxides and hydroxides in the bath.

During the reduction precipitation step, which follows the combination of hypophosphite and amine borane reducing agent, and metal salt in the bath, it may be advantageous to employ an ultrasonic field which aids in forming alloys having a very fine and uniform particle size range, which, in turn, leads to superior magnetic results.

The ultrasonic field may be generated by commercially available devices which vibrate a blade at a high frequency, or by piezoelectric crystal transducers (e.g., quartz, barium titanate, and the like) which convert electric energy into untrasonic waves between 10 Kcps and 1 Mcps; or by other transducers which are described in the literature and known in the art. Low intensities of the order of 0.1 – 0.7 watt per square centimeter of ultrasonic energy are generally adequate to disperse the precipitate and prevent particle agglomeration by vibrational motion in the bath.

An external magnetic field effecting the reaction mixture during the formation of the precipitate can be used to enhance the character of the particles formed, but it is not an essential feature of this invention. Fields of AC or DC magnetization of as much as 1000 oersteds, and more, can be used to advantage.

Uses for the materials produced in the foregoing example are well known. The ferromagnetic alloy particles produced by the foregoing examples may be coated with non-magnetic organic film-forming materials to inhibit agglomeration. These coating materials may be organic polymers or non-magnetic fillers which have known utility in the preparation of magnetic recording media and magnetic responsive fluids, such as are used in the electromagnetic clutch of Rabinow, U.S. Pat. No. 2,575,360, or the electrostrictive fluid compositions of the type shown in Winslow, U.S. Pat. Nos. 2,417,850 or 2,886,150.

Typical, but not limiting, binders for preparing various recording media including ferromagnetic particles produced in accordance with this invention are polyesters, cellulose esters and ethers, vinyl chloride, vinyl acetate, acrylate and styrene polymers and co-polymers, polyurethanes, polyamides, aromatic polycarbonates and polyphonyl ethers.

A wide variety of solvents may be used for forming a dispersion of the fine ferromagnetic particles and binders. Organic solvents, such as ethyl, butyl, and amyl acetate, isopropyl alcohol, dioxane, acetone, methylisobutyl ketone, cyclohexanone, and toluene are useful for this purpose. The particle-binder dispersion may be applied to a suitable substrate by roller coating, gravure coating, knife coating, extrusion, or spraying of the mixture onto the backing or by other known methods. The specific choice of non-magnetic substrate binder, solvent, or method of application of the magnetic composition to the support will vary with the properties desired and the specific form of the magnetic recording medium being produced.

In preparing recorded media, the magnetic particles usually comprise about 40–90% by weight of the solids in the film layer applied to the substrate. The substrate is usually a flexible resin, such as polyester or cellulose acetate material, although other flexible materials as well as rigid base materials are more suitable for some uses.

In preparing magnetic cores and permanent magnets, the products of the examples are mixed with non-magnetic plastic or filler in an amount of about 33-50% by volume of the finished magnetic metal; the particles aligned in a magnetic field; and the mixture pressed into a firm magnet structure. Alignment of the particles may be accomplished in an externally applied DC magnetic field of about 4000 gauss, or more, and fields up to 28000 gauss may be used. Pressures may vary widely in forming the magnet. Pressures up to 100,000 psi have been used commercially.

Modification of cobalt salts with iron, as taught in Example V, is useful for producing particles from which magnets or cores can be made, since the magnetization of an iron-cobalt alloy particle is dependent on (a) the ratio of the iron to cobalt, and (b) the unit particle size (see Japanese Journal of Applied Physics, Vol. 6, No. 9 pp. 1096–1100, Sept. 1967).

While the invention has been particularly shown and described with reference to preferred embodiments thereof, it will be understood by those skilled in the art that various changes in form and details may be made without departing from the spirit and scope of the invention.

What is claimed is:

1. A method of manufacturing particulate magnetic recording media comprising:

reacting a solution consisting essentially of hypophosphite and amine borane reducing agents and reducible metal cations selected from the group consisting of cobalt cations, and mixtures of cobalt and iron cations, and mixtures of cobalt and nickel cations and mixtures thereof to form finely divided ferromagnetic alloy particles;

separating the particles;

adding a non-magnetic binder to said magnetic particles in a solvent for the binder to form a dispersion;

coating a non-magnetic base with said dispersion; and drying the coating.

2. A method as claimed in claim 1 wherein after the alloy particles produced are separated from the reaction solution, they are washed and dried.

3. A method as claimed in claim 2 wherein the particles are dried in the absence of oxygen.

4. A method as claimed in claim 1, wherein the source of hypophosphite anion is an alkali metal hypophosphite salt, and the source of amine borane is dimethyl amine borane.

5. A method as claimed in claim 1, wherein the ferromagnetic alloy particles consist essentially, by weight, of 0.1–5% phosphorus, 0.1–1.5% boron, 0.8–10% oxygen, and the balance a metallic ferromagnetic material selected from the group consisting of cobalt, cobalt-iron, and cobalt-nickel.

6. A method as claimed in claim 1, wherein a magnetic field is applied to the reactants during the reaction forming finely divided ferromagnetic particles.

7. Magnetic recording media produced by the process of claim 1.

8. A method of manufacturing particulate magnetic recording media comprising:

preparing a bath consisting essentially of hypophosphite anion reducing agent and reducible metal cations selected from the group consisting of cobalt cations, and mixtures of cobalt and iron cations and mixtures of cobalt and nickel cations and mixtures thereof;

preparing a solution including amine borane anion reducing agent;

mixing the amine borane anion solution with the hypophosphite anion-metal cation bath;

heating the mixture at a temperature and for a time sufficient to form finely divided cobalt alloys having a diameter of about 0.01 to 3 microns;

removing the magnetic particles from the bath;

combining said magnetic particles with a non-magnetic binder in a solvent for the binder to form a dispersion;

coating a non-magnetic base with said dispersion; and then drying the coating.

* * * * *